US011516195B2

(12) United States Patent
Kawahara et al.

(10) Patent No.: US 11,516,195 B2
(45) Date of Patent: Nov. 29, 2022

(54) TERMINAL DEVICE, KEY DISTRIBUTION MANAGEMENT DEVICE, SERVER-CLIENT SYSTEM, COMMUNICATION METHOD, AND PROGRAMS

(71) Applicant: NIPPON TELEGRAPH AND TELEPHONE CORPORATION, Chiyoda-ku (JP)

(72) Inventors: Yuto Kawahara, Musashino (JP);
Hitoshi Fuji, Musashino (JP);
Tetsutaro Kobayashi, Musashino (JP);
Reo Yoshida, Musashino (JP);
Tomohide Yamamoto, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 806 days.

(21) Appl. No.: 16/306,707

(22) PCT Filed: Jun. 8, 2017

(86) PCT No.: PCT/JP2017/021277
§ 371 (c)(1),
(2) Date: Dec. 3, 2018

(87) PCT Pub. No.: WO2017/221723
PCT Pub. Date: Dec. 28, 2017

(65) Prior Publication Data

US 2019/0124058 A1    Apr. 25, 2019

(30) Foreign Application Priority Data

Jun. 20, 2016    (JP) ............................. JP2016-121400

(51) Int. Cl.
*H04L 9/40* (2022.01)
*H04L 9/08* (2006.01)
(Continued)

(52) U.S. Cl.
CPC ............ *H04L 63/062* (2013.01); *G06F 21/44* (2013.01); *G06F 21/60* (2013.01); *H04L 9/08* (2013.01);
(Continued)

(58) Field of Classification Search
CPC .................................................... H04L 63/062
See application file for complete search history.

(56) References Cited

U.S. PATENT DOCUMENTS 6,684,331 B1 *  1/2004  Srivastava ............ H04L 9/0836
                                                           713/163
8,483,390 B2 *  7/2013  Wei ....................... H04L 9/3066
                                                           380/255
(Continued)

FOREIGN PATENT DOCUMENTS

JP    2000-196583 A    7/2000
JP    2016-134826 A1   7/2016
WO    WO 2016/199507 A1  12/2016

OTHER PUBLICATIONS

Extended European Search Report dated Dec. 20, 2019 in European Patent Application No. 17815192.4, 8 pages.
(Continued)

*Primary Examiner* — William S Powers
(74) *Attorney, Agent, or Firm* — Oblon, McClelland, Maier & Neustadt, L.L.P.

(57) ABSTRACT

To provide a terminal device that can share a session key for use in encryption communication with multiple terminal devices at a certain timing without relying on an existing server device. The terminal device includes: a list/request sending unit that, when the terminal device operates as an owner device, generates a key distribution request, signs the key distribution request, and transmits the key distribution request to a key distribution management device; a participation request sending unit that, when the terminal device
(Continued)

operates as a general device, generates a participation request, signs the participation request, and transmits the participation request to the key distribution management device; a session key generating unit that executes an authentication-based multipoint key distribution algorithm of server-client type in cooperation with another terminal device participating in the session and with the key distribution management device to generate a session key; and a post-confirmation unit that, when the session key has been normally generated, transmits a success notice to the key distribution management device and receives a collective notice from the key distribution management device.

8 Claims, 9 Drawing Sheets

(51) Int. Cl.
  *G06F 21/60*   (2013.01)
  *H04L 9/32*   (2006.01)
  *G06F 21/44*   (2013.01)
  *H04W 12/0431*   (2021.01)
  *H04W 12/0433*   (2021.01)
  *H04L 65/1104*   (2022.01)
  *H04W 12/06*   (2021.01)

(52) U.S. Cl.
  CPC .......... *H04L 9/0825* (2013.01); *H04L 9/0861* (2013.01); *H04L 9/32* (2013.01); *H04L 63/12* (2013.01); *H04L 65/1104* (2022.05); *H04W 12/0431* (2021.01); *H04W 12/0433* (2021.01); *H04W 12/06* (2013.01)

(56) References Cited

U.S. PATENT DOCUMENTS

| | | | | |
|---|---|---|---|---|
| 9,894,151 | B2* | 2/2018 | Dhuse | H04N 21/8358 |
| 10,425,411 | B2* | 9/2019 | Huang | H04L 9/3268 |
| 2002/0154782 | A1* | 10/2002 | Chow | H04L 9/3268 |
| | | | | 380/278 |
| 2011/0243324 | A1* | 10/2011 | Lima | H04L 9/0819 |
| | | | | 380/212 |
| 2017/0302445 | A1* | 10/2017 | Kobayashi | H04L 9/0869 |
| 2018/0183583 | A1 | 6/2018 | Yoshida et al. | |

OTHER PUBLICATIONS

Kobayashi, T. et al. "Scalable and Dynamic Multi-Cast Key Distribution", Symposium on Cryptography and Information Security Koen Ronbunshu, XP009517230, Jan. 19, 2016, pp. 1-7.

Yoneyama, K. et al "Multi-cast Key Distribution: Scalable, Dynamic and Provably Secure Construction", International Conference on Financial Cryptography and Data Security; [Lecture Notes in Computer Science; Lect.Notes Computer], XP047360993, Oct. 13, 2016, pp. 207-226.

Rescorla. E. et al "WebRTC Security Architecture draft-ietf-rtcweb-security-arch-12. txt", Internet Engineering Task Force, IETF; Standardworkingdraft, Internet Society (ISOC), XP015113429, Jun. 9, 2016, pp. 1-43.

International Search Report dated Aug. 22, 2017 in PCT/JP2017/021277 filed on Jun. 8, 2017.

Rosenberg, J. et al., "SIP: Session Initiation Protocol", [online], [searched on Jun. 3, 2016], the Internet <URL: http://www.softfront.co.jp/tech/ietfdoc/trans/rfc3261j.txt>, 269 pages.

Okamoto, T. et al., "Fully Secure Functional Encryption with General Relations from the Decisional Linear Assumption", Advances in Cryptology—CRYPTO 2010, Lecture Notes in Computer Science (LNCS), 2010, vol. 6223, pp. 191-208.

Katz, J. et al., "Predicate Encryption Supporting Disjunctions, Polynomial Equations, and Inner Products", EUROCRYPT, Lecture Notes in Computer Science (LNCS), 2008, vol. 4965, pp. 146-162.

Okamoto, T. et al., "Hierarchical Predicate Encryption for Inner-Products", ASIACRYPT, Lecture Notes in Computer Science (LNCS), 2009, vol. 5912, pp. 214-231.

* cited by examiner

TERMINAL DEVICE, KEY DISTRIBUTION
MANAGEMENT DEVICE, SERVER-CLIENT
SYSTEM, COMMUNICATION METHOD,
AND PROGRAMS

TECHNICAL FIELD

The present invention relates to a terminal device, key distribution management device, server-client system, communication method, and programs for executing an authentication-based multipoint key distribution algorithm of server-client type.

BACKGROUND ART

In recent years, it has been increasingly difficult to guarantee the confidentiality of communications or telephone calls with the current encryption communication methods, demonstrated such as by an allegation of large-scale eavesdropping in which a government is engaged. There is accordingly a growing need for reconstructing a method of secure communications or telephone calls between clients.

In response to the need, a system providing for secure telephone calls at multiple points against a large-scale eavesdropper has been achieved with an encryption telephone system using an SIP server, a client, and a key distribution management device.

Some existing methods for guaranteeing the confidentiality of telephone calls employ SIP+SRTP protocols. Known relevant protocols include the followings:
RFC3261 (a protocol for establishing a session, for example, Non-patent Literature 1),
RFC4568 (a protocol which prescribes notations for establishing an encryption session or the like), and
RFC3711 (a protocol for one-to-one encryption telephone call)

Similarly, there are a number of techniques for establishing a one-to-one encryption session like the above protocols in communications other than telephone calls as well.

PRIOR ART LITERATURE

Patent Literature

Patent Literature 1: Japanese Patent Application Laid Open No. 2016-134826
Patent Literature 2: International Publication No. WO2016/199507

Non-Patent Literature

Non-patent Literature 1: J. Rosenberg et. al., "SIP: Session Initiation Protocol", [online], [searched on Jun. 3, 2016], the Internet <URL: http://www.softfront.co.jp/tech/ietfdoc/trans/rfc3261j.txt>

SUMMARY OF THE INVENTION

Problems to be Solved by the Invention

In encryption communication and telephone calls with the foregoing protocols, the followings cannot be achieved:
(1) A session key cannot be updated during a session because exchange of a session key for starting an encryption communication or telephone call is performed only at the start of the session.
(2) A message format for exchanging a session key is dependent on the format of transmitted/received messages used in a certain protocol.
(3) Not available for communication or a telephone call among more than one-to-one parties.
When viewing the above issues in combination with SIP+SRTP,
(1) Exchange of a key is performed only at the start of a telephone call and the session key cannot be updated during the session.
(2) Since exchange of a key is performed by being embedded in an INVITE message of the SIP protocol or the like, it is dependent on the message.
(3) Not available for a telephone call among multiple parties, such as in a conference call.

An object of the present invention is therefore to provide a terminal device that can share a session key for use in encryption communication with multiple terminal devices at a certain timing without relying on an existing server device.

Means to Solve the Problems

A terminal device according to the present invention is a terminal device in a server-client system including N terminal devices, a key distribution management device, and an authentication information database, where N is an integer greater than 1. The terminal device includes a list/request sending unit, a participation request sending unit, a session key generating unit, and a post-confirmation unit.

The list/request sending unit generates, when the terminal device operates as an owner device, a key distribution request that contains a user list containing IDs of terminal devices participating in a session and an ID of the terminal device as the owner device, signs the key distribution request with a secret key of the terminal device as the owner device, transmits the key distribution request to the key distribution management device, and maintains a connection with the key distribution management device.

The participation request sending unit generates, when the terminal device operates as a general device, a participation request containing the ID of the terminal device, signs the participation request with the secret key of the terminal device, transmits the participation request to the key distribution management device, and maintains the connection with the key distribution management device.

The session key generating unit executes an authentication-based multipoint key distribution algorithm of server-client type in cooperation with another terminal device participating in the session and with the key distribution management device to generate a session key.

When the session key has been normally generated, the post-confirmation unit transmits a success notice indicating that the session key has been normally generated to the key distribution management device, and receives, from the key distribution management device, a collective notice meaning that the success notice has been received from all of the terminal devices participating in the session.

Effects of the Invention

The terminal device according to the present invention can share a session key for use in encryption communication with multiple terminal devices at a certain timing without relying on an existing server device.

DETAILED DESCRIPTION OF THE EMBODIMENT

An embodiment of the present invention will now be described in detail. Note that components having the same functionality are given the same numbers and repeated description is omitted.

First Embodiment

Figure 1:
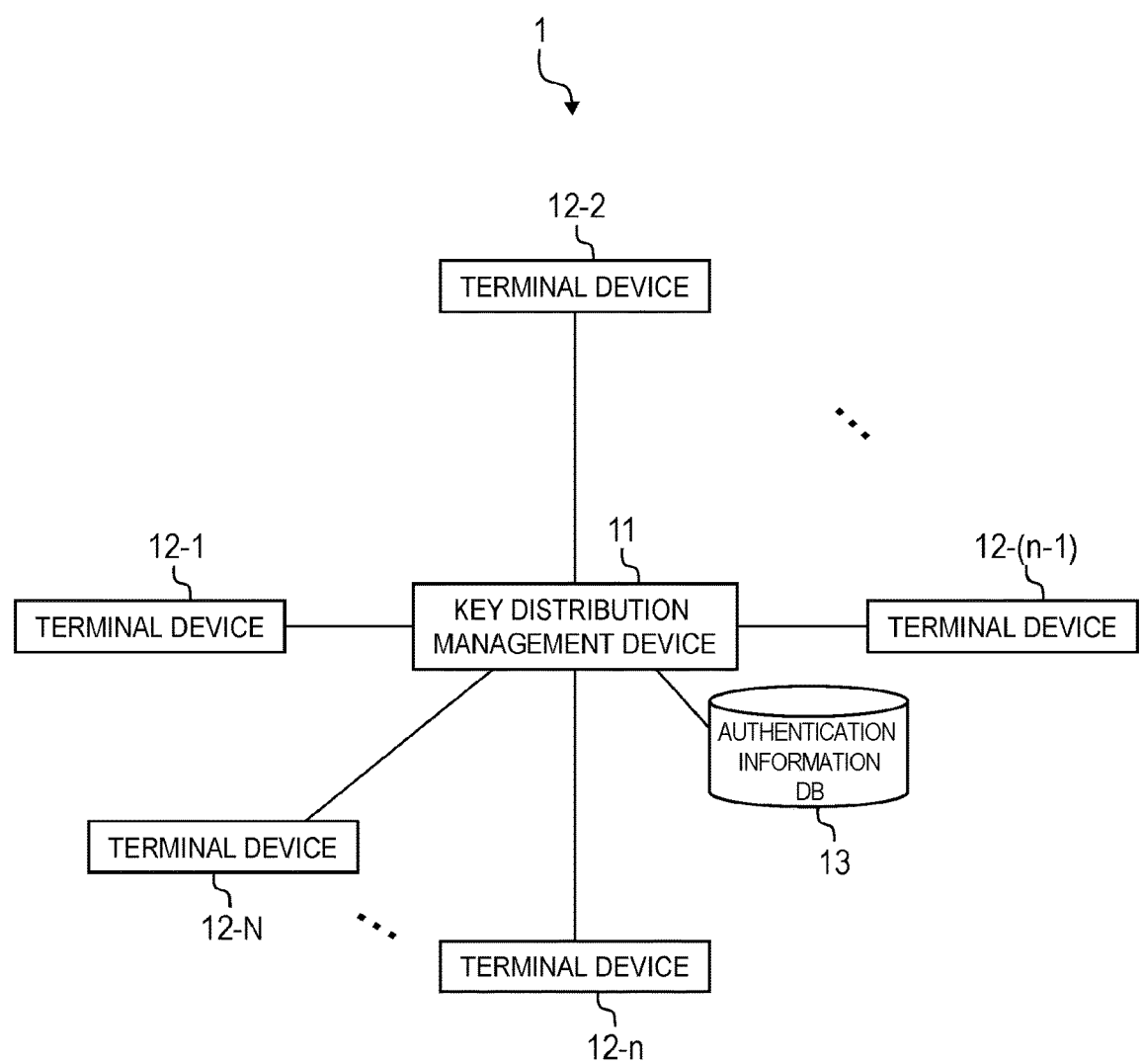
FIG. 1 is a block diagram showing a general configuration of a server-client system in a first embodiment.

Now referring to FIG. 1, the configuration of a server-client system according to a first embodiment is described. As shown in FIG. 1, a server-client system 1 in this embodiment includes a key distribution management device 11, N (where N is an integer greater than 1) terminal devices 12-1, . . . , 12-N, and an authentication information database 13. The terminal devices 12-1, . . . , 12-N and the key distribution management device 11 are configured to be capable of communicating over an unsecured communication path such as the Internet. The authentication information database 13 has stored therein authentication information for authenticating the terminal devices 12-1, . . . , 12-N (for example, the IDs and RSA public keys of the terminal devices 12-1, . . . , 12-N). It is also assumed that the key distribution management device 11 and the terminal devices 12-1, . . . , 12-N possess secret information (for example, an RSA secret key) for authentication of themselves.

Figure 2:
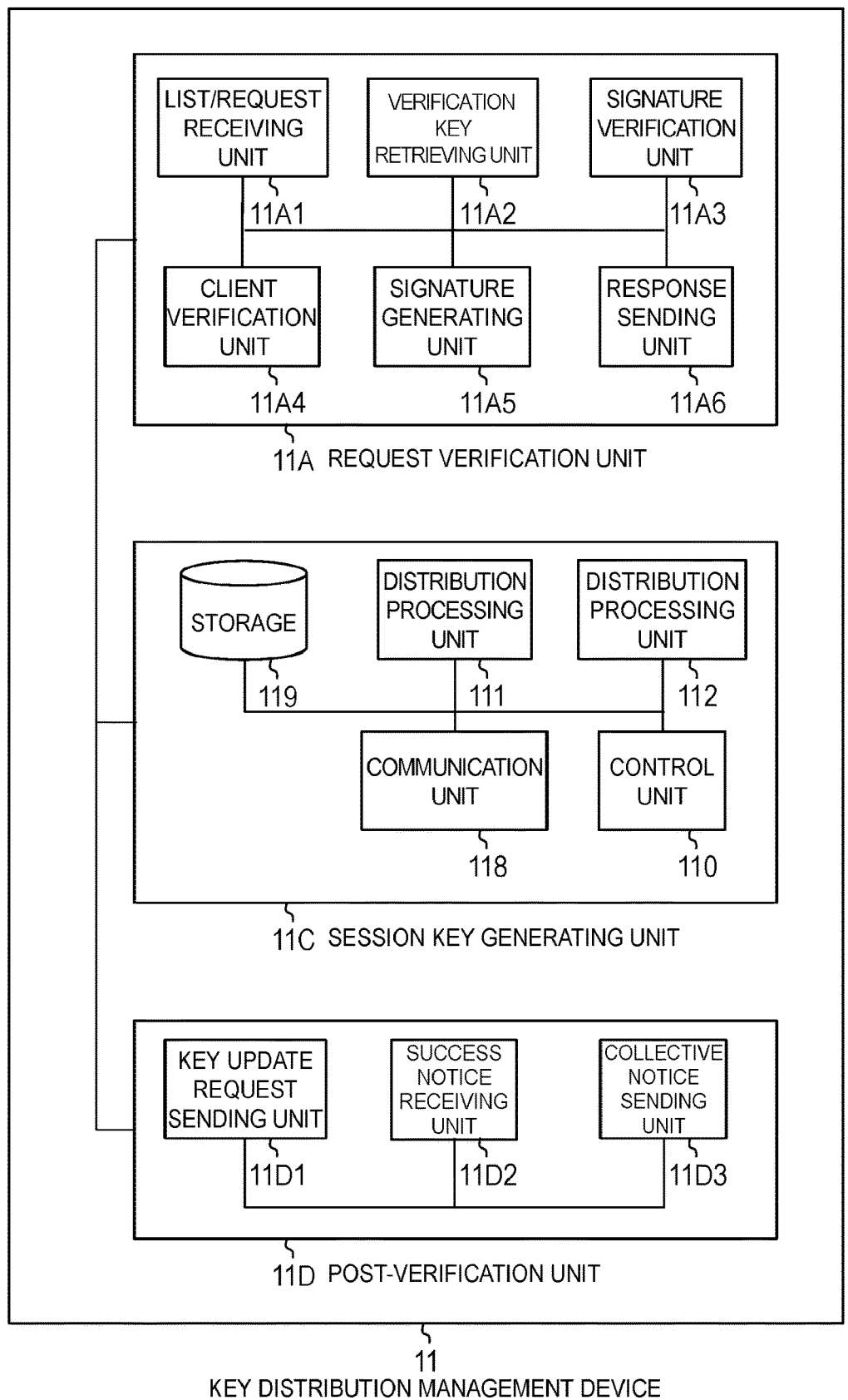
FIG. 2 is a block diagram showing a configuration of a key distribution management device in the first embodiment.

Now referring to FIG. 2, the configuration of the key distribution management device 11 in this embodiment is described. As shown in FIG. 2, the key distribution management device 11 in this embodiment includes a request verification unit 11A, a session key generating unit 11C, and a post-verification unit 11D. The request verification unit 11A includes a list/request receiving unit 11A1, a verification key retrieving unit 11A2, a signature verification unit 11A3, a client verification unit 11A4, a signature generating unit 11A5, and a response sending unit 11A6. The session key generating unit 11C includes a control unit 110, distribution processing units 111, 112, a communication unit 118, and a storage 119. The post-verification unit 11D includes a key update request sending unit 11D1, a success notice receiving unit 11D2, and a collective notice sending unit 11D3.

Figure 3:
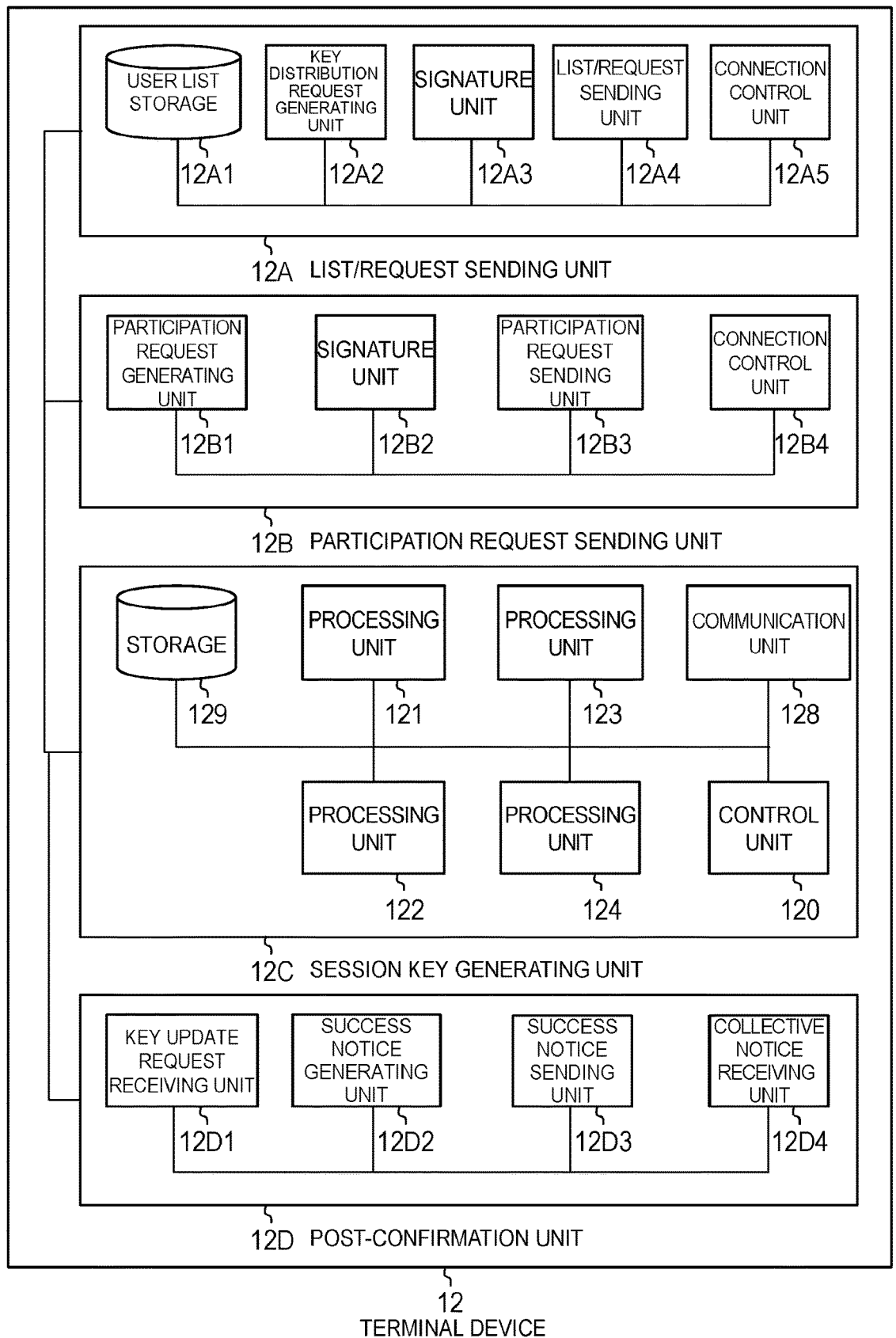
FIG. 3 is a block diagram showing a configuration of a terminal device in the first embodiment.
Figure 4:
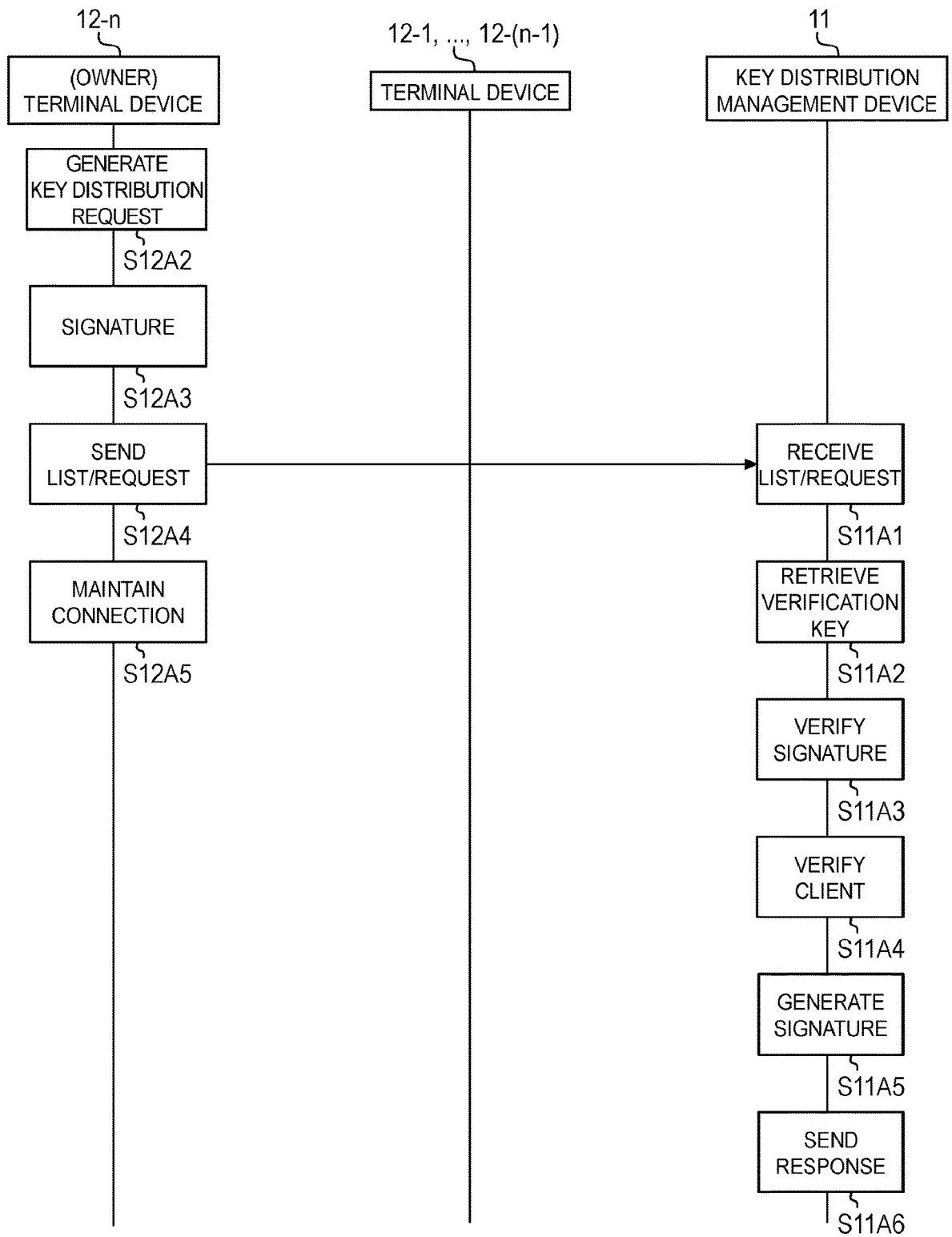
FIG. 4 is a sequence chart showing list/request sending and verifying operations in the server-client system in the first embodiment.
Figure 5:
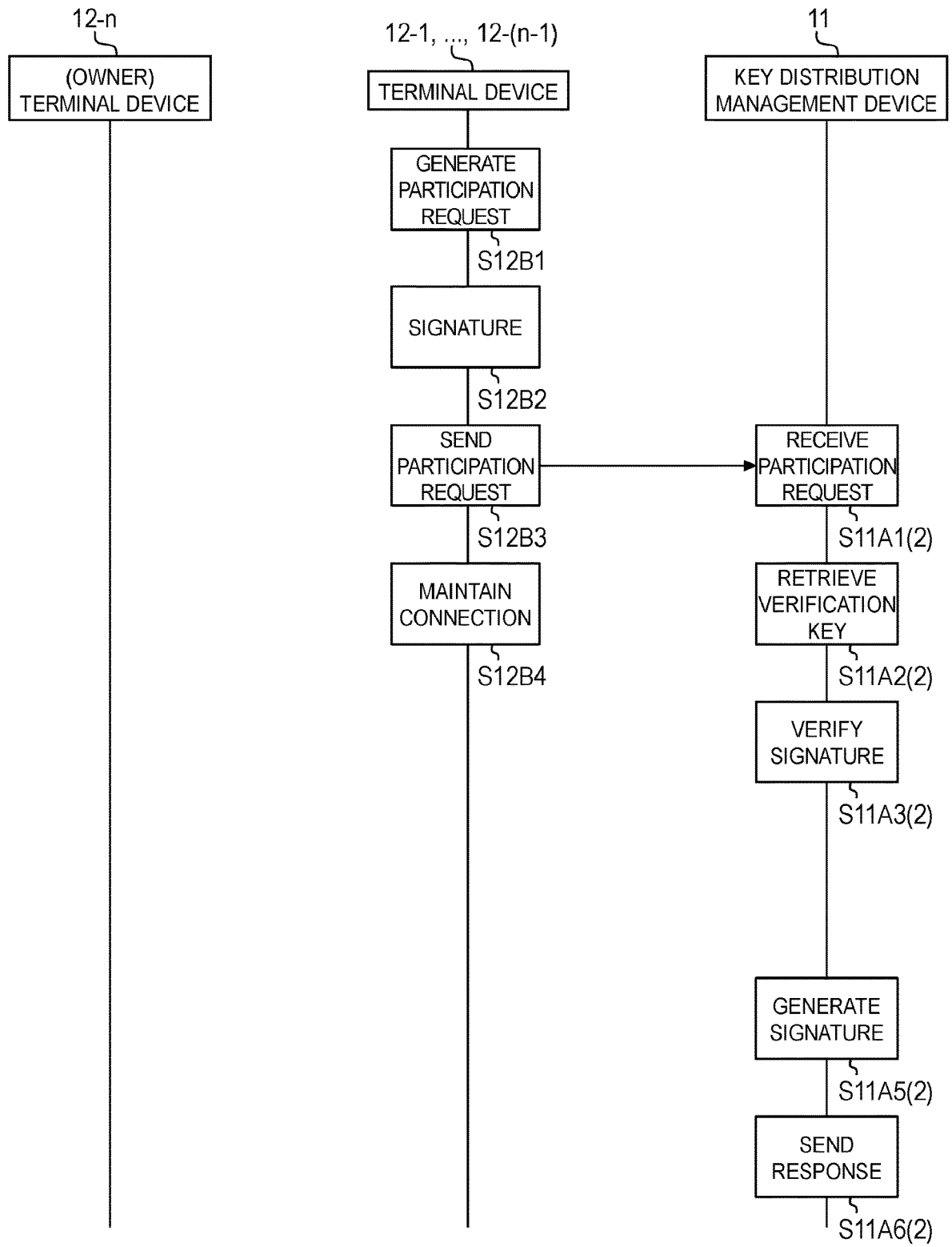
FIG. 5 is a sequence chart showing participation request sending and verifying operations in the server-client system in the first embodiment.

Now referring to FIG. 3, the configuration of the terminal device 12 in this embodiment is described. As shown in FIG. 3, the terminal device 12 in this embodiment includes a list/request sending unit 12A, a participation request sending unit 12B, a session key generating unit 12C, and a post-confirmation unit 12D. The list/request sending unit 12A includes a user list storage 12A1, a key distribution request generating unit 12A2, a signature unit 12A3, a list/request sending unit 12A4, and a connection control unit 12A5. The participation request sending unit 12B includes a participation request generating unit 12B1, a signature unit 12B2, a participation request sending unit 12B3, and a connection control unit 12B4. The session key generating unit 12C includes a control unit 120, processing units 121 to 124, a communication unit 128, and a storage 129. The post-confirmation unit 12D includes a key update request receiving unit 12D1, a success notice generating unit 12D2, a success notice sending unit 12D3, and a collective notice receiving unit 12D4.

Each of the devices is a device that is configured by execution of a predetermined program by a general- or special-purpose computer having a communication device, a processor such as a central processing unit (CPU) (a hardware processor), and memories such as random-access memory (RAM) and read-only memory (ROM), for example. The computer may have a single processor and memory or may have more than one processor and memory. The program may be installed in the computer or recorded in the ROM or the like in advance. Also, some or all of the processing units may be configured using an electronic circuit that embodies processing functions without using programs, instead of an electronic circuit (circuitry) that embodies functional configurations via reading of programs, such as a CPU. Also, an electronic circuit constituting a single device may include multiple CPUs. Also, the respective devices perform their processing under the control of their respective control unit 110, 120. Data resulting from processing performed by the respective devices are sequentially stored in their respective storage 119, 129 and read from it to be used as required.

Now referring to FIGS. 4 to 8, the operation of the individual devices will be described in detail. In the process described herein, terminal devices 12-$\sigma(1)$ to 12-$\sigma(n)$, which is a subset (a user set) of the set consisting of the terminal devices 12-1 to 12-N, initiate a session and share a session key. Here, n is an integer from 2 to N (both inclusive), and $\{\sigma(1), \ldots, \sigma(n)\} \subset \{1, \ldots, N\}$ holds. For the simplicity of description, hereinafter assume that $(\sigma(1), \ldots, \sigma(n))=(1, \ldots, n)$ without loss of generality.

Note that the following description assumes that a terminal device 12-$n$ acts as an owner device and the other terminal devices 12-1, . . . , 12-($n-1$) participating in the session act as general devices.

<Step S12A>

The list/request sending unit 12A of the terminal device 12-$n$ operating as the owner device generates a key distribution request that contains a user list containing the IDs of the terminal devices (12-1, . . . , 12-$n$) participating in the session and the ID of the terminal device 12-$n$, signs the key distribution request with a secret key of the terminal device 12-$n$, transmits the key distribution request to the key distribution management device 11, and maintains a connection with the key distribution management device 11 (this operation is referred to as step S12A).

Specifically, the user list storage 12A1 of the list/request sending unit 12A prestores a user list that has been obtained in some way. The key distribution request generating unit 12A2 generates a key distribution request containing the ID of the terminal device 12-$n$ and the user list (S12A2). The signature unit 12A3 signs the key distribution request with the secret key of the terminal device 12-$n$ (S12A3). The list/request sending unit 12A4 transmits the key distribution request to the key distribution management device 11 (S12A4). The connection control unit 12A5 maintains the connection with the key distribution management device 11 (S12A5).

<Step S11A>

The request verification unit 11A of the key distribution management device 11 receives the key distribution request from the owner device 12-$n$, retrieves a verification key for the owner device 12-$n$ from the authentication information database 13, verifies a signature of the key distribution request, verifies whether all of the IDs of the terminal devices (12-1, . . . , 12-$n$) contained in the user list are IDs that exist in the authentication information database 13 or not, and transmits a response signed with the secret key of the key distribution management device 11 in accordance with the result of the verification to the owner device 12-$n$ (this operation is referred to as step S11A).

Specifically, the list/request receiving unit 11A1 of the request verification unit 11A receives the key distribution request from the owner device 12-$n$ (S11A1). The verification key retrieving unit 11A2 retrieves the verification key for the owner device 12-$n$ from the authentication information database 13 (S11A2). The signature verification unit 11A3 verifies the signature of the key distribution request (S11A3). The client verification unit 11A4 verifies whether all of the IDs of the terminal devices (12-1, . . . , 12-$n$) contained in the user list are IDs that exist in the authentication information database 13 or not (S11A4). The signature generating unit 11A5 signs a response with the secret key of the key distribution management device 11 in accordance with the result of the verification (S11A5). The response sending unit 11A6 transmits the signed response to the owner device 12-$n$ (S11A6).

<Step S12B>

The participation request sending unit 12B of each of the terminal devices 12-1, . . . , 12-($n$-1) operating as general devices generates a participation request containing the ID of its own terminal device 12, signs the participation request with the secret key of its own terminal device 12, transmits the participation request to the key distribution management device 11, and maintains the connection with the key distribution management device 11 (this operation is referred to as step S12B).

Specifically, the participation request generating unit 12B1 of the participation request sending unit 12B generates a participation request containing the ID of its own terminal device 12 (S12B1). The signature unit 12B2 signs the participation request with the secret key of its own terminal device 12 (S12B2). The participation request sending unit 12B3 transmits the participation request to the key distribution management device 11 (S12B3). The connection control unit 12B4 maintains the connection with the key distribution management device 11 (S12B4).

<Step S11A(2)>

The request verification unit 11A of the key distribution management device 11 receives the participation requests from the general devices 12-1, . . . , 12-($n$-1), retrieves the verification keys for the general devices 12-1, . . . , 12-($n$-1) from the authentication information database 13, verifies the signatures of the participation requests, and transmits a response signed with the secret key of the key distribution management device 11 in accordance with the result of the verification to the general devices 12-1, . . . , 12-($n$-1) (this operation is referred to as step S11A(2)).

Specifically, the list/request receiving unit 11A1 of the request verification unit 11A receives the participation requests from the general devices 12-1, . . . , 12-($n$-1) (S11A1(2)). The verification key retrieving unit 11A2 retrieves the verification keys for the general devices 12-1, . . . , 12-($n$-1) from the authentication information database 13 (S11A2(2)). The signature verification unit 11A3 verifies the signatures of the participation requests (S11A3(2)). The signature generating unit 11A5 signs a response with the secret key of the key distribution management device 11 in accordance with the result of the verification (S11A5(2)). The response sending unit 11A6 transmits the signed response to the general devices 12-1, . . . , 12-($n$-1) (S11A6(2)).

<Step S12C>

The session key generating unit 12C of a terminal device 12-$p$ participating in the session (where p is one of 1, n) executes an authentication-based multipoint key distribution algorithm (also well known in the art as the Multi-Cast Key Distribution Algorithm) of server-client type in cooperation with another terminal device 12-$q$ participating in the session (where q≠p and q=1, . . . , n) and with the key distribution management device 11 to generate a session key (this operation is referred to as step S12C). Note that the terminal device 12-$p$ is not directly connected with the other terminal device 12-$q$ over a communication path; results of computation from the individual terminal devices are all transmitted to the key distribution management device 11, which, after receiving the results of computation, transmits results of computation based on those results of computation to the individual terminal devices 12-1, . . . , 12-($n$-1). That is to say, it should be noted that the "cooperation" above means "cooperation" processing that is executed by way of a central device like the key distribution management device 11.

<Step S11C>

In a similar way, the session key generating unit 11C of the key distribution management device 11 executes an authentication-based multipoint key distribution algorithm of server-client type in cooperation with the terminal devices 12-1, . . . , 12-$n$ participating in the session and causes the terminal devices 12-1, . . . , 12-$n$ participating in the session to generate a session key (this operation is referred to as step S11C).

<Details of Steps S12C and S11C>

Now referring to FIG. 6, an example of detailed operation at steps S12C and S11C (the authentication-based multipoint key distribution algorithm of server-client type) will be described.

Figure 6:
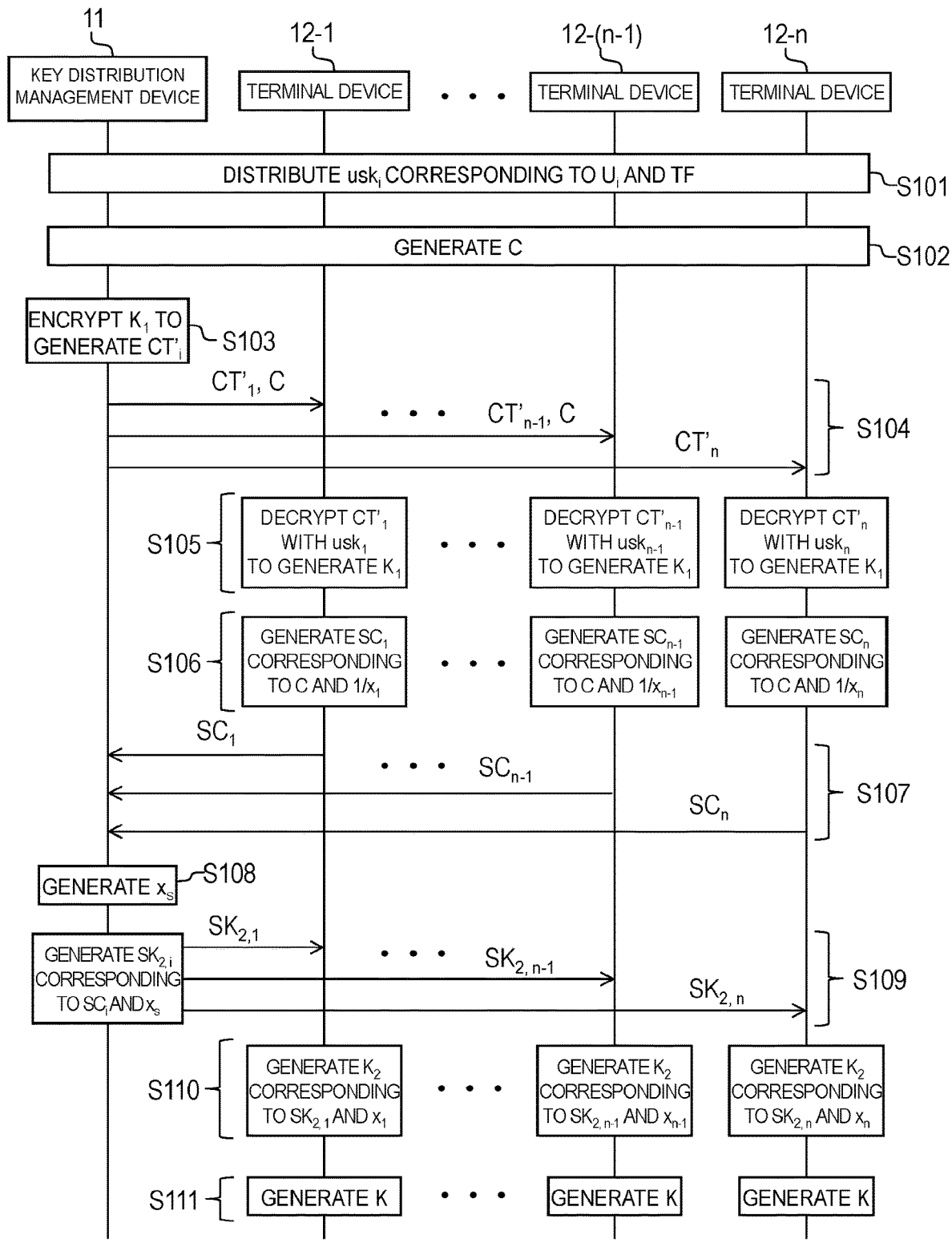
FIG. 6 is a sequence chart showing a session key generating operation in the server-client system in the first embodiment (an authentication-based multipoint key distribution algorithm of server-client type).
Figure 7:
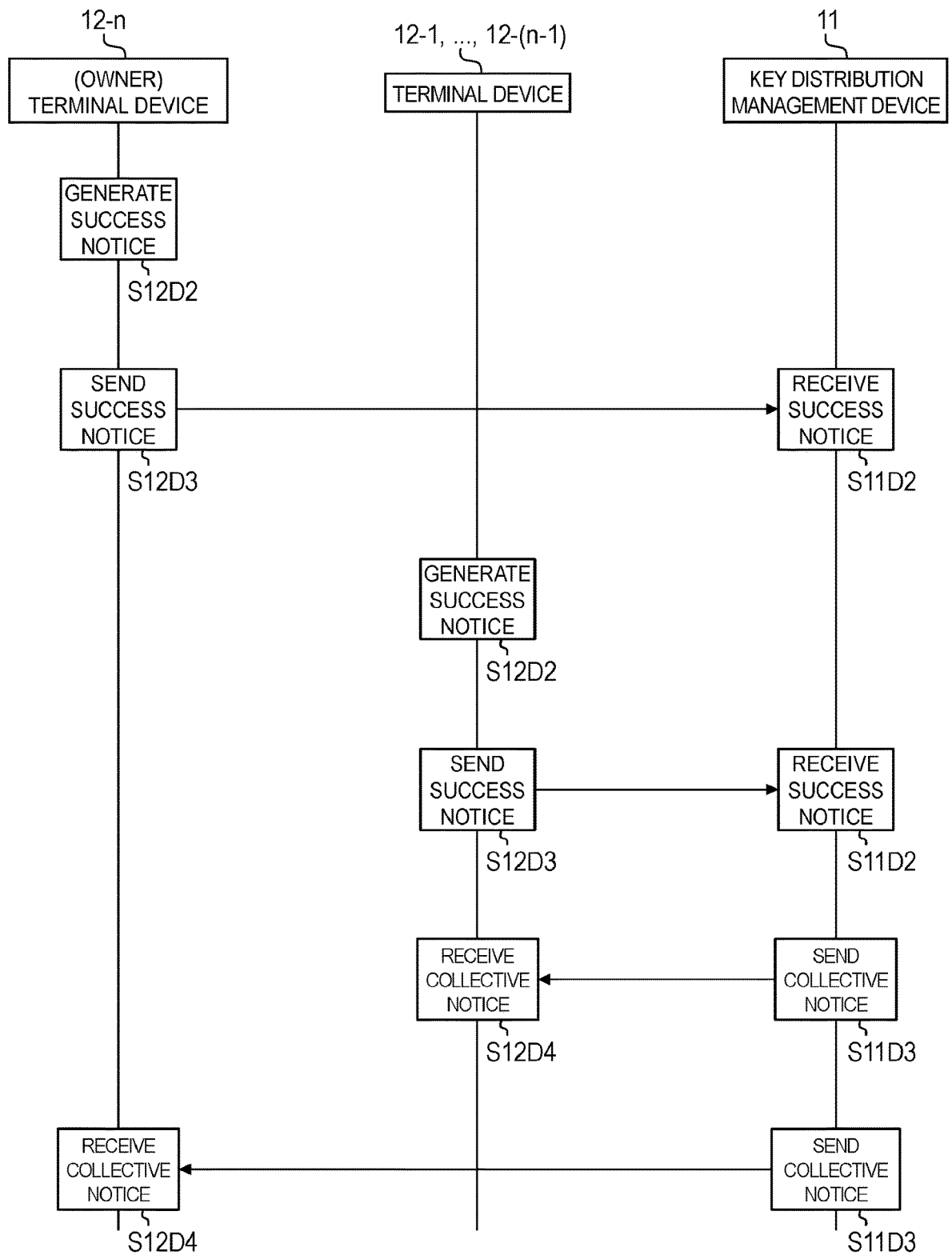
FIG. 7 is a sequence chart showing post-verification and post-confirmation operations in the server-client system in the first embodiment.

As illustrated in FIG. 6, the distribution processing unit 111 of the key distribution management device 11 (FIG. 2) first generates a secret key usk$_i$ corresponding to information V (U$_i$, time), which includes identification information U$_i$ of a terminal device 12-$i$ and information corresponding to a time belonging to an effective time segment (time frame) TF, time∈TF, in conformance to the functional encryption scheme, and securely distributes the secret key usk$_i$ to the terminal device 12-$i$. Here, i∈[1, n] holds. The "effective time segment" is a predetermined time segment which is updated upon a certain trigger. The secret key usk$_i$ may be encrypted with the public key of the terminal device 12-$i$ before being distributed, or may be distributed on a secure communication path, or may be distributed being stored on a portable recording medium. The secret key usk$_i$ is obtained such as by decryption at the terminal device 12-$i$ (FIG. 3) and securely stored in the storage 129-$i$ (step S101).

A "functional encryption scheme" is a scheme where cipher text is decrypted if a combination of information called "attribute information" and information called "access structure (or predicate information)" is in a relationship that makes the truth value of a predetermined logical expression "true". In the functional encryption scheme, one of the "attribute information" and the "access structure (or predicate information)" is embedded in a secret key and the other information is embedded in cipher text. If the "attribute information" or "access structure (or predicate information)" embedded in the secret key and the "access structure (or predicate information)" or "attribute information" embedded in the cipher text are in a relationship that makes the truth value of the logical expression "true" as described above, a decryption result is obtained from the secret key and the cipher text. The "functional encryption scheme" is also known as "function-type encryption scheme" or "predicate encryption scheme", and specific schemes are disclosed in, for example, Reference Literature 1 (T. Okamoto, K. Takashima, "Fully Secure Functional Encryption with General Relations from the Decisional Linear Assumption", Advances in Cryptology—CRYPTO 2010, Lecture Notes in Computer Science, 2010, Volume 6223/2010, 191-208), Reference Literature 2 (J. Katz, A. Sahai, and B. Waters., "Predicate encryption supporting disjunctions, polynomial equations, and inner products", In EUROCRYPT, pp. 146-162, 2008), and Reference Literature 3 (T. Okamoto and K. Takashima., "Hierarchical predicate encryption for inner-products", In ASIACRYPT, pp. 214-231, 2009.). However, the functional encryption schemes applicable in this embodiment are not limited to those schemes. The "information V ($U_i$, time)" may be information composed of identification information $U_i$ and information corresponding to the time, time$\in$TF, or may be information composed of identification information $U_i$, information corresponding to the time, time$\in$TF, and other information (such as public parameters and a session ID). This embodiment shows an example where the "information V ($U_i$, time)" is "attribute information". Although "attribute information" and "access structure (or predicate information)" are not limited in how they may be implemented; for example, "attribute information" and "predicate information" can be implemented as a vector or a set of vectors, while "access structure" can be implemented with a labeled matrix consisting of a matrix and labels corresponding to the rows of the matrix, and a mapping (for example, a mapping of a vector). For example, a logical sum $(\alpha_1=\eta_1)\vee(\alpha_2=\eta_2)$ for proposition 1 that "$\alpha_1$ is $\eta_1$" and proposition 2 that "$\alpha_2$ is $\eta_2$" can be represented by a polynomial: $(\alpha_1-\eta_1)\cdot(\alpha_2-\eta_2)$. If the logical sum $(\alpha_1=\eta_1)\vee(\alpha_2=\eta_2)$ is true, then $(\alpha_1-\eta_1)\cdot(\alpha_2-\eta_2)=0$; if the logical sum $(\alpha_1=\eta_1)\vee(\alpha_2=\eta_2)$ is false, then $(\alpha_1-\eta_1)\cdot(\alpha_2-\eta_2)\neq 0$. That is, the logical sum $(\alpha_1=\eta_1)\vee(\alpha_2=\eta_2)$ being true is equivalent to $(\alpha_1-\eta_1)\cdot(\alpha_2-\eta_2)=0$. Likewise, a logical product $(\alpha_1=\eta_1)\wedge(\alpha_2=\eta_2)$ for proposition 1 that "$\alpha_1$ is $\eta_1$" and proposition 2 that "$\alpha_2$ is $\eta_2$" can be represented by a polynomial: $\iota_1\cdot(\alpha_1-\eta_1)+\iota_2\cdot(\alpha_2-\eta_2)$. Here, $\iota_1$ and $\iota_2$ are random numbers. If the logical product $(\alpha_1=\eta_1)\wedge(\alpha_2=\eta_2)$ is true, then $\iota_1\cdot(\alpha_1-\eta_1)+\iota_2\cdot(\alpha_2-\eta_2)=0$; if the logical product $(\alpha_1=\eta_1)\wedge(\alpha_2=\eta_2)$ is false, then $\iota_1\cdot(\alpha_1-\eta_1)+\iota_2\cdot(\alpha_2-\eta_2)\neq 0$. That is, the logical product $(\alpha_1=\eta_1)\wedge(\alpha_2=\eta_2)$ being true is equivalent to $\iota_1\cdot(\alpha_1-\eta_1)+\iota_2\cdot(\alpha_2-\eta_2)=0$. In this manner, a logical expression can be represented by a polynomial. Also, a polynomial representing a logical expression can be represented by the inner product of two vectors. That is, a polynomial representing a logical expression is equal to the inner product of a vector whose elements are the indeterminate components of the respective terms and 1's and a vector whose vectors are the coefficient components of the respective terms. Thus, a vector or a set of vectors can be used to implement the "attribute information" or "predicate information", and the truth value of a logical expression being true can be replaced with the inner product being 0. In a similar manner, a mapping corresponding to such a vector set and a labeled matrix can be used to implement the "access structure". Note that, given that TF=$\{t_{min}, \ldots, t_{max}\}$ for example, time$\in$TF can be represented by a logical sum like (time=$t_{min}$)$\vee \ldots \vee$(time=$t_{max}$) (step S101).

Next, the key distribution management device 11 and the terminal devices 12-1 to 12-$n$ generate common information C in cooperation. In doing so, a terminal secret value $x_i$ of each terminal device 12-$i$ is used. For example, where G is a multiplication cyclic group of order p, g$\in$G is the generator of group G, and $x_i \in Z_p$, the key distribution management device 11 and the terminal devices 12-1 to 12-$n$ generate C:=$g^{x1 \cdot x2 \cdots xn}$ in cooperation. Here, "$\alpha$:=$\beta$" means that $\alpha$ represents $\beta$ (that $\alpha$ is defined as $\beta$). The superscript "xi" represents "$x_i$". For a set X=$\{x_1, \ldots, x_n\}$, $g^{x1 \cdot x2 \cdots xn}$ is denoted as $g^{\Pi X}$. If X is an empty set, then $\Pi X=1$. The common information C is stored in the storage 119 of the key distribution management device 11 (FIG. 2), and the terminal secret value $x_i$ that was used in generation of the common information C is securely stored in the storage 129-$i$ of each terminal device 12-$i$ (FIG. 3) (step S102).

The distribution processing unit 111 of the key distribution management device 11 (FIG. 2) generates a first seed value $K_1$, encrypts the first seed value $K_1$ in conformance to the functional encryption scheme, generates cipher text $CT'_i$ that can be decrypted with the secret key usk$_i$ corresponding to information that includes identification information $U_i$ of the terminal device 12-$i$ and information corresponding to a time belonging to the effective time segment TF, and outputs the cipher text $CT'_i$ (where $i\in[1, n]$) and the common information C. This cipher text $CT'_i$ is cipher text that can be decrypted with the secret key usk$_i$ if the identification information $U_i$ and the time, time, corresponding to that secret key usk$_i$ makes a logical expression $P_i$:=(ID=$U_i$)$\wedge$(time$\in$TF) true. The first seed value $K_1$ is stored in the storage 119 (step S103).

The cipher text $CT'_i$ and the common information C are sent to the communication unit 118, which then transmits them to the terminal device 12-$i$ (where $i\in[1, n]$) (step S104). The cipher text $CT'_i$ and the common information C are input to the communication unit 128-$i$ of each terminal device 12-$i$ (where $i\in[1, n]$) and stored in the storage 129-$i$. Each processing unit 121-$i$ reads the secret key usk$_i$ and cipher text $CT'_i$ from the storage 129-$i$, decrypts the input cipher text $CT'_i$ using the input secret key usk$_i$ and in conformance to the functional encryption scheme to generate the first seed value $K_1$, and stores the first seed value $K_1$ in the storage 129-$i$ (step S105).

The processing unit 122-$i$ of each terminal device 12-$i$ reads the common information C and the terminal secret value $x_i$ from the storage 129-$i$, generates concealed common information $SC_i$ corresponding to the input common information C and the inverse element $1/x_i$ of the terminal secret value $x_i$, and outputs the concealed common information $SC_i$. For example, the processing unit 122-$i$ generates $SC_i$:=$C^{1/xi}$ (step S106). The concealed common information $SC_i$ is sent to the communication unit 128-$i$, which then transmits the concealed common information $SC_i$ to the key distribution management device 11 (step S107).

The concealed common information $SC_i$ (where $i \in [1, n]$) is input to the communication unit 118 of the key distribution management device 11 (FIG. 2) and stored in the storage 119. The distribution processing unit 112 generates a management secret value $x_s$ and stores it in the storage 119 (step S108). The distribution processing unit 112 reads the concealed common information $SC_i$ (concealed common information $SC_i$ generated by concealing the common information C) and the management secret value $x_s$ from the storage 119, generates concealed information $SK_{2,i}$ for a second seed value corresponding to the input concealed common information $SC_i$ and the management secret value $x_s$, and outputs the concealed information $SK_{2,i}$ for the second seed value. For example, given that $x_s \in Z_p$, the distribution processing unit 112 generates $SK_{2,i} := SC_i^{xs} = C^{(1/xi) \cdot xs}$. Here, the superscript "$x_s$" represents "$x_s$". The concealed information $SK_{2,i}$ for the second seed value is sent to the communication unit 118, which then transmits the concealed information $SK_{2,i}$ (where $i \in [1, n]$) for the second seed value to the terminal device 12-$i$ (step S109).

The concealed information $SK_{2,i}$ (where $i \in [1, n]$) for the second seed value is input to the communication unit 128-$i$ of the terminal device 12-$i$ (FIG. 3) and stored in the storage 129-$i$. Each processing unit 123-$i$ (where $i \in [1, n]$) reads the concealed information $SK_{2,i}$ for the second seed value and the terminal secret value $x_i$ from the storage 129-$i$, and generates and outputs a second seed value $K_2$ corresponding to the input concealed information $SK_{2,i}$ for the second seed value and the terminal secret value $x_i$. For example, the processing unit 123-$i$ generates $K_2 := SK_{2,i}^{xi} = C^{(1/xi) \cdot xs \cdot xi} = C^{xs}$. The second seed value $K_2$ is stored in the storage 129-$i$ (step S110).

Each processing unit 124-$i$ (where $i \in [1, n]$) reads the first seed value $K_1$ and the second seed value $K_2$ from the storage 129-$i$, and obtains and outputs the session key K that corresponds to the information containing the first seed value $K_1$ and the information containing the second seed value $K_2$. This enables the terminal devices 12-1 to 12-$n$ to share the session key K. The information containing the first seed value $K_1$ may be information composed only of the first seed value $K_1$, or may be information composed of the first seed value $K_1$ and other information (such as public parameters and a session ID). Similarly, the information containing the second seed value $K_2$ may be information composed only of the second seed value $K_2$, or may be information composed of the second seed value $K_2$ and other information (such as public parameters and a session ID). Also, the session key K is uniquely determined from the information containing the first seed value $K_1$ and the information containing the second seed value $K_2$. From a security perspective, it is desirable that the session key K is information in which information about the first seed value $K_1$ and information about the second seed value $K_2$ are hidden. In other words, it is desirable that neither information about the first seed value $K_1$ nor information about the second seed value $K_2$ leaks from the session key K. This can prevent an attack from an attacker in case of any leakage of the session key K to the attacker just by updating either the first seed value $K_1$ or the second seed value $K_2$ and updating the session key K according to the updated seed value (step S111). An example of the authentication-based multipoint key distribution algorithm of server-client type has been described with reference to FIG. 6. The algorithm that can be utilized at steps S12C and S11C is not limited to the example of FIG. 6, however. Examples of conventional authentication-based multipoint key distribution algorithms of server-client type include Patent Literatures 1 and 2, for example. Steps S12C and S11C may be embodied using any of conventional authentication-based multipoint key distribution algorithms of server-client type.

<Step S12D First Half>

When a session key has been normally generated, the post-confirmation unit 12D of the terminal devices 12-1, . . . , 12-$n$ participating in a session transmits a success notice indicating that the session key has been normally generated to the key distribution management device 11 (this operation is referred to as step S12D first half).

Specifically, the success notice generating unit 12D2 of the post-confirmation unit 12D generates a success notice (S12D2). The success notice sending unit 12D3 transmits the success notice to the key distribution management device 11 (S12D3).

<Step S11D>

The post-verification unit 11D of the key distribution management device 11 receives the success notices from the terminal devices 12-1, . . . , 12-$n$ participating in the session, and transmits a collective notice meaning that the success notice has been received from all of the terminal devices 12-1, . . . , 12-$n$ participating in the session to all of the terminal devices 12-1, . . . , 12-$n$ participating in the session (this operation is referred to as step S11D).

Specifically, the success notice receiving unit 11D2 of the post-verification unit 11D receives the success notices from the terminal devices 12-1, . . . , 12-$n$ participating in the session (S11D2). The collective notice sending unit 11D3 transmits the collective notice to all of the terminal devices 12-1, . . . , 12-$n$ participating in the session (S11D3).

<Step S12D Latter Half>

Finally, the collective notice receiving unit 12D4 of the terminal devices 12-1, . . . , 12-$n$ participating in the session receives the collective notice from the key distribution management device 11 (S12D4).

<Session Key Updating Operation>

Figure 8:
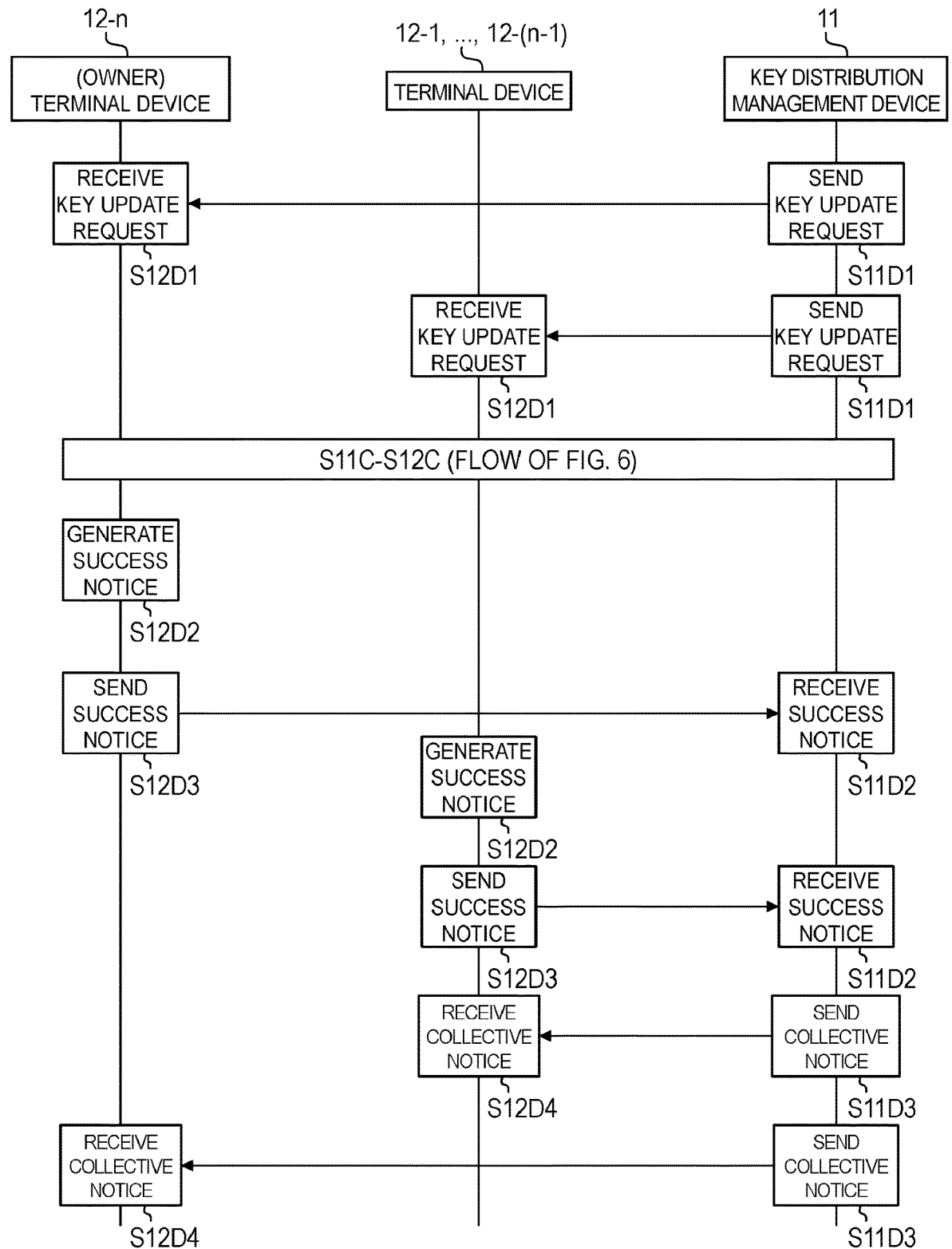
FIG. 8 is a sequence chart showing a session key updating operation in the server-client system in the first embodiment.

Now referring to FIG. 8, a session key updating operation is described. As the premises upon which the updating operation is performed, it is assumed that distribution of a new session key/updating of the session key has been completed, the terminal devices 12-1, . . . , 12-$n$ participating in the session are maintaining the connection with the key distribution management device 11, and an interval for periodical update of the session key is preset in the key distribution management device 11.

First, triggered by arrival of a preset session key update time, the key update request sending unit 11D1 of the post-verification unit 11D of the key distribution management device 11 transmits a key update request to the terminal devices 12-1, . . . , 12-$n$ participating in the session (S11D1). The key update request receiving unit 12D1 of the terminal devices 12-1, . . . , 12-$n$ participating in the session receives the key update request from the key distribution management device 11 (S12D1). Then, the steps S11C and S12C described above are executed to generate a new session key. Finally, the steps S12D and S11D described above are executed to make post-confirmation and post-verification of whether a session key has been normally generated.

As discussed above, the server-client system 1 in this embodiment allows multiple terminal devices to share a session key for use in encryption communication at a certain timing without relying on an existing server device. The system in this embodiment is also applicable with other protocols (for example, JINGLE, XMPP) because exchange of a key can be done between the key distribution management device 11 and the terminal device 12 also when other protocol is employed.

<Exemplary Implementation>

Figure 9:
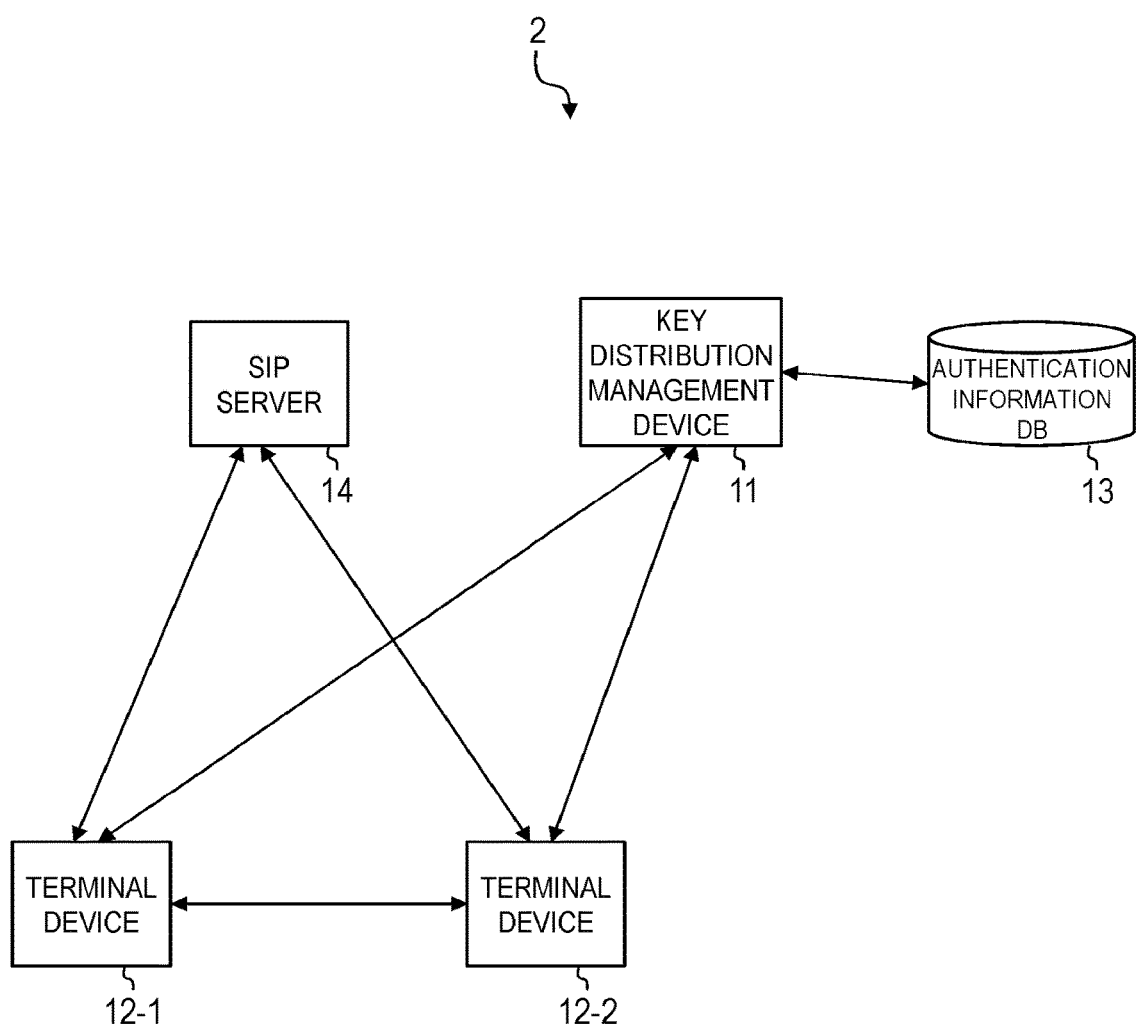
FIG. 9 shows an example of embodying an encryption telephone system with SRTP by combination of the server-client system in the first embodiment with a conventional SIP server.

Now referring to FIG. 9, a server-client system 2 is described as an example where the server-client system 1 of the first embodiment is implemented in an SIP+SRTP-based encryption telephone system.

In this case, the functions which have been conventionally provided by an SIP server are distributed between the key distribution management device 11 and the terminal device 12 as follows:

(1) A key distribution request to the key distribution management device 11 is made by the terminal device 12 itself. At the time of a request, a signature is attached using secret information possessed by the terminal device 12. The key distribution management device 11 confirms whether the requesting terminal device 12 is a correct user or not by authenticating the terminal device 12 with data from the authentication information database 13. Similarly, a signature of the key distribution management device 11 is attached to a response, thereby preventing spoofing or the like on the server side as well. For the signature, a desired signature scheme (for example, RSA signature) is employed.

(2) The terminal device 12 autonomously connects to the key distribution management device 11 (for example, it makes a connection to the key distribution management device 11 by itself triggered by receiving a telephone call).

(3) For the terminal device 12 to manage correct distribution/update of the session key by itself, an ACK notice is exchanged between the terminal device 12 and the key distribution management device 11 after a key distribution process ends, thereby confirming that the session key has been correctly distributed to all of the terminal devices 12 participating in the session.

It is understood that an SIP+SRTP-based encryption telephone system is embodied without modifying the SIP server 14 in the exemplary implementation above.

APPENDIX

Each device according to the present invention has, as a single hardware entity, for example, an input unit to which a keyboard or the like is connectable, an output unit to which a liquid crystal display or the like is connectable, a communication unit to which a communication device (for example, communication cable) capable of communication with the outside of the hardware entity is connectable, a central processing unit (CPU, which may include cache memory and/or registers), RAM or ROM as memories, an external storage device which is a hard disk, and a bus that connects the input unit, the output unit, the communication unit, the CPU, the RAM, the ROM, and the external storage device so that data can be exchanged between them. The hardware entity may also include, for example, a device (drive) capable of reading and writing a recording medium such as a CD-ROM as desired. A physical entity having such hardware resources may be a general-purpose computer, for example.

The external storage device of the hardware entity has stored therein programs necessary for embodying the aforementioned functions and data necessary in the processing of the programs (in addition to the external storage device, the programs may be prestored in ROM as a storage device exclusively for reading out, for example). Also, data or the like resulting from the processing of these programs are stored in the RAM and the external storage device as appropriate.

In the hardware entity, the programs and data necessary for processing of the programs stored in the external storage device (or ROM and the like) are read into memory as necessary to be interpreted and executed/processed as appropriate by the CPU. As a consequence, the CPU embodies predetermined functions (the functional components represented above as units or the like).

The present invention is not limited to the above embodiment, but modifications may be made within the scope of the present invention. Also, the processes described in the embodiment may be executed not only in a chronological sequence in accordance with the order of their description but may be executed in parallel or separately according to the processing capability of the device executing the processing or any necessity.

As already mentioned, when the processing functions of the hardware entities described in the embodiment (the devices of the present invention) are to be embodied with a computer, the processing actions of the functions to be provided by the hardware entities are described by a program. By the program then being executed on the computer, the processing functions of the hardware entity are embodied on the computer.

The program describing the processing actions can be recorded on a computer-readable recording medium. The computer-readable recording medium may be any kind, such as a magnetic recording device, an optical disk, a magneto-optical recording medium, or a semiconductor memory. More specifically, a magnetic recording device may be a hard disk device, flexible disk, or magnetic tape; an optical disk may be a DVD (digital versatile disc), a DVD-RAM (random access memory), a CD-ROM (compact disc read only memory), or a CD-R (recordable)/RW (rewritable); a magneto-optical recording medium may be an MO (magneto-optical disc); and a semiconductor memory may be EEP-ROM (electronically erasable and programmable-read only memory), for example.

Also, the distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers from the server computer via a network.

The computer that executes such a program first, for example, temporarily stores the program recorded on the portable recording medium or the program transferred from the server computer in a storage device thereof. At the time of execution of processing, the computer then reads the program stored in the storage device thereof and executes the processing in accordance with the read program. Also, as another form of execution of this program, the computer may read the program directly from the portable recording medium and execute the processing in accordance with the program and, furthermore, every time the program is transferred to the computer from the server computer, the computer may sequentially execute the processing in accordance with the received program. Also, a configuration may be adopted in which the transfer of a program to the computer from the server computer is not performed and the above-described processing is executed by so-called application service provider (ASP)-type service by which the processing functions are implemented only by an instruction for execution thereof and result acquisition. Note that a program in this form shall encompass information that is used in processing by an electronic computer and acts like a program (such as data that is not a direct command to a computer but has properties prescribing computer processing).

Further, although the hardware entity was described as being configured via execution of a predetermined program on a computer in this form, at least some of these processing actions may instead be embodied with hardware.

What is claimed is:

1. A terminal device in a server-client system including N terminal devices, a key distribution management device, and an authentication information database, where N is an integer greater than 1, the terminal device comprising:
    a list/request sending unit that, when the terminal device operates as an owner device, generates a key distribution request that contains a user list, that is stored in advance at a memory of the owner device, containing IDs of terminal devices participating in a session and an ID of the terminal device as the owner device, signs the key distribution request with a secret key of the terminal device as the owner device, transmits the key distribution request to the key distribution management device, and maintains a connection with the key distribution management device;
    a participation request sending unit that, when the terminal device operates as a general device, generates a participation request containing the ID of the terminal device, signs the participation request with the secret key of the terminal device, transmits the participation request to the key distribution management device, and maintains the connection with the key distribution management device;
    a session key generating unit that executes an authentication-based multipoint key distribution algorithm of server-client type in cooperation with another terminal device participating in the session and with the key distribution management device to generate a session key; and
    a post-confirmation unit that, when the session key has been normally generated, transmits a success notice indicating that the session key has been normally generated to the key distribution management device, and receives, from the key distribution management device, a collective notice meaning that the success notice has been received from all of the terminal devices participating in the session.

2. A key distribution management device in a server-client system including N terminal devices, the key distribution management device, and an authentication information database, where N is an integer greater than 1, the key distribution management device comprising:
    a request verification unit that receives, from one of the terminal devices that operates as an owner device, a key distribution request that contains a user list, that is stored in advance at a memory of the owner device, containing IDs of terminal devices participating in a session and an ID of the owner device and is signed with a secret key of the owner device, retrieves a verification key for the owner device from the authentication information database, verifies a signature of the key distribution request, verifies whether all of the IDs of the terminal devices contained in the user list are IDs that exist in the authentication information database or not, transmits a response signed with a secret key of the key distribution management device in accordance with a result of the verification to the owner device, receives, from each one of the terminal devices that operates as a general device, a participation request signed with a secret key of the general device and containing an ID of the general device, retrieves a verification key for the general device from the authentication information database, verifies a signature of the participation request, and transmits a response signed with the secret key of the key distribution management device in accordance with a result of the verification to the general device;
    a session key generating unit that executes an authentication-based multipoint key distribution algorithm of server-client type in cooperation with the terminal devices participating in the session to cause the terminal devices participating in the session to each generate a session key; and
    a post-verification unit that receives a success notice indicating that the session key has been normally generated from each of the terminal devices participating in the session, and transmits a collective notice meaning that the success notice has been received from all of the terminal devices participating in the session to all of the terminal devices participating in the session.

3. A server-client system comprising:
    N terminal devices, where N is an integer greater than 1;
    a key distribution management device; and
    an authentication information database, wherein
    each one of the terminal devices includes
        a list/request sending unit that, when the terminal device operates as an owner device, generates a key distribution request that contains a user list, that is stored in advance at a memory of the owner device, containing IDs of terminal devices participating in a session and an ID of the terminal device as the owner device, signs the key distribution request with a secret key of the terminal device as the owner device, transmits the key distribution request to the key distribution management device, and maintains a connection with the key distribution management device,
        a participation request sending unit that, when the terminal device operates as a general device, generates a participation request containing the ID of the terminal device, signs the participation request with the secret key of the terminal device, transmits the participation request to the key distribution management device, and maintains the connection with the key distribution management device,
        a session key generating unit that executes an authentication-based multipoint key distribution algorithm of server-client type in cooperation with another terminal device participating in the session and with the key distribution management device to generate a session key, and
        a post-confirmation unit that, when the session key has been normally generated, transmits a success notice indicating that the session key has been normally generated to the key distribution management device, and receives, from the key distribution management device, a collective notice meaning that the success notice has been received from all of the terminal devices participating in the session, and the key distribution management device includes
        a request verification unit that receives the key distribution request from the owner device, retrieves a verification key for the owner device from the authentication information database, verifies a signature of the key distribution request, verifies whether all of the IDs of the terminal devices contained in the user list are IDs that exist in the authentication information database or not, transmits a response signed with a secret key of the key distribution management device in accordance with a result of the verification to the owner device, receives the participation request from the general device, retrieves a verification key for the general device from the authentication information database, verifies a signature of the participation request, and transmits a response signed with the secret key of the key distribution management device in accordance with a result of the verification to the general device, a session key generating unit that executes an authentication-based multipoint key distribution algorithm of server-client type in cooperation with the terminal devices participating in the session to cause the terminal devices participating in the session to each generate a session key, and a post-verification unit that receives the success notice from each of the terminal devices participating in the session, and transmits the collective notice to all of the terminal devices participating in the session.

4. A communication method for execution by a terminal device in a server-client system including N terminal devices, a key distribution management device, and an authentication information database, where N is an integer greater than 1, the communication method comprising the steps of:

when the terminal device operates as an owner device, generating a key distribution request that contains a user list, that is stored in advance at a memory of the owner device, containing IDs of terminal devices participating in a session and an ID of the terminal device as the owner device, signing the key distribution request with a secret key of the terminal device as the owner device, transmitting the key distribution request to the key distribution management device, and maintaining a connection with the key distribution management device;

when the terminal device operates as a general device, generating a participation request containing the ID of the terminal device, signing the participation request with the secret key of the terminal device, transmitting the participation request to the key distribution management device, and maintaining the connection with the key distribution management device;

executing an authentication-based multipoint key distribution algorithm of server-client type in cooperation with another terminal device participating in the session and with the key distribution management device to generate a session key; and when the session key has been normally generated, transmitting a success notice indicating that the session key has been normally generated to the key distribution management device, and receiving, from the key distribution management device, a collective notice meaning that the success notice has been received from all of the terminal devices participating in the session.

5. A communication method for execution by a key distribution management device in a server-client system including N terminal devices, the key distribution management device, and an authentication information database, where N is an integer greater than 1, the communication method comprising the steps of:

receiving, from one of the terminal devices that operates as an owner device, a key distribution request that contains a user list, that is stored in advance at a memory of the owner device, containing IDs of terminal devices participating in a session and an ID of the owner device and is signed with a secret key of the owner device, retrieving a verification key for the owner device from the authentication information database, verifying a signature of the key distribution request, verifying whether all of the IDs of the terminal devices contained in the user list are IDs that exist in the authentication information database or not, transmitting a response signed with a secret key of the key distribution management device in accordance with a result of the verification to the owner device, receiving, from each one of the terminal devices that operates as a general device, a participation request signed with a secret key of the general device and containing an ID of the general device, retrieving a verification key for the general device from the authentication information database, verifying a signature of the participation request, and transmitting a response signed with secret key of the key distribution management device in accordance with a result of the verification to the general device;

executing an authentication-based multipoint key distribution algorithm of server-client type in cooperation with the terminal devices participating in the session to cause the terminal devices participating in the session to each generate a session key; and receiving a success notice indicating that the session key has been normally generated from each of the terminal devices participating in the session, and transmitting a collective notice meaning that the success notice has been received from all of the terminal devices participating in the session to all of the terminal devices participating in the session.

6. A communication method for execution by a server-client system including N terminal devices, a key distribution management device, and an authentication information database, where N is an integer greater than 1, wherein one of the terminal devices that operates as an owner device executes the step of generating a key distribution request that contains a user list, that is stored in advance at a memory of the owner device, containing IDs of terminal devices participating in a session and an ID of the terminal device as the owner device, signing the key distribution request with a secret key of the terminal device as the owner device, transmitting the key distribution request to the key distribution management device, and maintaining a connection with the key distribution management device, the key distribution management device executes the step of receiving the key distribution request from the owner device, retrieving a verification key for the owner device from the authentication information database, verifying a signature of the key distribution request, verifying whether all of the IDs of the terminal devices contained in the user list are IDs that exist in the authentication information database or not, and transmitting a response signed with a secret key of the key distribution management device in accordance with a result of the verification to the owner device, a terminal device operating as a general device executes the step of generating a participation request containing an ID of the terminal device, signing the participation request with a secret key of the terminal device, transmitting the participation request to the key distribution management device, and maintaining a connection with the key distribution management device, the key distribution management device executes the step of receiving the participation request from the general device, retrieving a verification key for the general device from the authentication information database, verifying a signature of the participation request, and transmitting a response signed with the secret key of the key distribution management device in accordance with a result of the verification to the general device, a terminal device participating in the session executes the step of executing an authentication-based multipoint key distribution algorithm of server-client type in cooperation with another terminal device participating in the session and with the key distribution management device to generate a session key, the key distribution management device executes the step of executing an authentication-based multipoint key distribution algorithm of server-client type in cooperation with the terminal devices participating in the session to cause the terminal devices participating in the session to each generate a session key, the terminal device participating in the session executes the step of, when the session key has been normally generated, transmitting a success notice indicating that the session key has been normally generated to the key distribution management device, the key distribution management device executes the step of receiving the success notice from each of the terminal devices participating in the session, and transmitting a collective notice meaning that the success notice has been received from all of the terminal devices participating in the session to all of the terminal devices participating in the session, and the terminal device participating in the session executes the step of receiving the collective notice from the key distribution management device.

7. A non-transitory computer-readable storage medium that stores a program for causing a computer to function as the terminal device according to claim 1.

8. A non-transitory computer-readable storage medium that stores a program for causing a computer to function as the key distribution management device according to claim 2.

* * * * *